(12) United States Patent
De Foras

(10) Patent No.: US 9,297,660 B2
(45) Date of Patent: Mar. 29, 2016

(54) SYSTEM AND METHOD FOR DETERMINING PARAMETERS REPRESENTING ORIENTATION OF A SOLID IN MOVEMENT SUBJECT TO TWO VECTOR FIELDS

(75) Inventor: Etienne De Foras, Saint-Nazaire-les-Eymes (FR)

(73) Assignee: Movea, Grenoble (FR)

( * ) Notice: Subject to any disclaimer, the term of this patent is extended or adjusted under 35 U.S.C. 154(b) by 181 days.

(21) Appl. No.: 12/937,797

(22) PCT Filed: Apr. 8, 2009

(86) PCT No.: PCT/EP2009/054185
§ 371 (c)(1),
(2), (4) Date: Oct. 14, 2010

(87) PCT Pub. No.: WO2009/127561
PCT Pub. Date: Oct. 22, 2009

(65) Prior Publication Data
US 2011/0035172 A1 Feb. 10, 2011

(30) Foreign Application Priority Data

Apr. 18, 2008 (FR) ...................................... 08 02172

(51) Int. Cl.
*G01C 21/00* (2006.01)
*G01C 21/16* (2006.01)
*G01C 17/38* (2006.01)
*G01C 25/00* (2006.01)

(52) U.S. Cl.
CPC ............. *G01C 21/165* (2013.01); *G01C 17/38* (2013.01); *G01C 25/005* (2013.01)

(58) Field of Classification Search
CPC ...... G01C 17/38; G01C 25/005; G01C 21/165
USPC .................................. 702/85, 92, 94–95, 189
See application file for complete search history.

(56) References Cited

U.S. PATENT DOCUMENTS

| 4,298,874 | A | * | 11/1981 | Kuipers ........................ 342/463 |
| 5,953,683 | A | | 9/1999 | Hansen et al. |
| 2002/0103610 | A1 | | 8/2002 | Bachmann et al. |
| 2006/0066295 | A1 | | 3/2006 | Tamura et al. |
| 2010/0121599 | A1 | * | 5/2010 | Boeve et al. ..................... 702/93 |

OTHER PUBLICATIONS

Written Opinion of the International Search Authority. Issued in International Application No. PCT/EP2009/054185. Oct. 19, 2010.

* cited by examiner

*Primary Examiner* — Mischita Henson
(74) *Attorney, Agent, or Firm* — Stroock & Stroock & Lavan LLP

(57) ABSTRACT

A system determines parameters representing the orientation of a solid in movement within a first vector field and a second vector field. A first triaxial sensor and a second triaxial sensor are connected to the solid and measure the components of the respective vector fields along the axes of the sensors, obtaining corresponding first and second vectors. A processor determines the rotation matrix of the solid, using a correction module for delivering a first corrected vector, and calculating a third vector which is not coplanar to the plane formed by the first corrected vector and the second vector, such that the angles of the axis system formed by the third vector and the first corrected vector and the second vector remain constant.

18 Claims, 3 Drawing Sheets

SYSTEM AND METHOD FOR DETERMINING PARAMETERS REPRESENTING ORIENTATION OF A SOLID IN MOVEMENT SUBJECT TO TWO VECTOR FIELDS

The invention relates to a system and a method for determining parameters representing the orientation of a solid in movement subject to two vector fields.

BACKGROUND OF THE INVENTION

Generally, systems for capturing the movement of a solid have applications in various fields such as health, multimedia or geophysics.

For video or video game applications, the movements of a user can be used to control virtual reality systems. As an example, the movements of a player may be recorded to control the movement of a virtual character in a synthetic scene.

In the field of portable electronics, movement capture devices enable the appliances to be adapted to the usage context. They make it possible, for example, to optimize the reception of a portable telephone by determining its orientation, or to enhance the interfaces of personal digital assistants.

Regarding the field of health, such systems can be used to position surgical tools, or to monitor the movements of elderly people or people who have health problems causing reduced mobility.

The movement sensors, and more specifically the angular position sensors, are greatly miniaturized and are the subject of research to give them a robustness and a cost that are compatible with applications aimed at the general public.

The position of a solid in space is entirely determined by establishing six quantities. Among these, three quantities can be distinguished that are likely to reflect translation movements and three other quantities likely to reflect rotation movements. The latter three quantities correspond to angular positions, called attitude angles, that can be used to determine movements. Furthermore, a rotation can be defined by a quaternion.

For example, the document FR 2 838 185 (Atomic Energy Commission) discloses a device for capturing the orientation of a solid comprising at least one angular position sensor likely to be made integral with the solid and to deliver at least one measurement datum representing the orientation of the solid, a means generating test data representing an estimated orientation of the solid, and a means for modifying the estimated orientation of the solid by comparing the measurement datum and test data. After one or more modifications of the estimated orientation, the latter converges toward the actual orientation of the solid, or, more specifically, toward the measured orientation. This device does not require any calculation means to establish the orientation or the inclination of the solid on the basis of a function of the sensor measurement data, and makes it possible to dispense with their nonlinear behaviors.

However, such a device requires numerous calculations and cannot, or can only with difficulty, be embedded on a system of reduced size. Such a device is also sensitive to the specific acceleration of the solid.

Therefore, the present invention aims to resolve the problems mentioned previously.

SUMMARY OF THE INVENTION

According to one aspect of the invention, there is proposed a system for determining parameters representing the orientation of a solid in movement, subject to a first vector field and a second vector field, said fields being of known directions in a fixed coordinate system not linked to the solid. Said system comprises a first triaxial sensor and a second triaxial sensor integral to said solid for measuring the components of said respective vector fields along the axes of said sensors, and means for determining the rotation matrix of the solid. Said means for determining said rotation matrix comprise:
  correction means, which can be deactivated on command, suitable for correcting the influence exerted on the measurements of at least one of said sensors by an additional vector field of the same nature as said measured vector field, and delivering at least one corrected vector field vector; and
  first means for calculating a third vector suitable for calculating said third vector which is not coplanar to the plane formed by the two vectors delivered by said correction means, and such that the angles of the axis system formed by the third vector and the two vectors delivered by said correction means remain constant.

Such a system makes it possible, at reduced cost, to produce a system for calculating attitude angles of a solid in movement using a greatly reduced number of calculations, facilitating its embedded implementation onboard a portable assembly of small size.

In one embodiment, said means for determining said rotation matrix also comprise means for orthogonalizing and centering the measurements transmitted by said triaxial sensors.

Thus, the simplicity of the algorithm allows for an implementation that consumes little energy, can be easily produced with an embedded processor.

According to one embodiment, said means for determining said rotation matrix also comprise control means suitable for deactivating said correction means at an instant taken for reference, while said first calculation means calculate a third reference vector.

The user can thus choose his reference.

Advantageously, the system also comprises automatic activation means suitable for activating said correction means when a norm of one of said vector fields transmitted by said triaxial sensors is above a reference threshold and for deactivating said correction means when said norm is below or equal to said reference threshold.

Thus, automatically, the system can deactivate the correction, for example, to initiate a motion recognition mode.

In one embodiment, said means for determining said rotation matrix also comprise second means for calculating an intermediate matrix whose successive columns are the components of said third vector, the components of said first vector field measured and, if necessary, corrected by said correction means, and the components of said second vector field measured and, if necessary, corrected by said correction means.

It is thus possible to indicate reference fields, for example in a magnetically disturbed environment, and to use them to render a rotation matrix correct.

According to one embodiment, said means for determining said rotation matrix also comprise third matrix inversion calculation means, suitable for being activated by said control means when calculating the third reference vector and for calculating the inverse matrix of said intermediate matrix corresponding to the third reference vector and called reference inverse matrix.

The matrix inversion calculations are carried out only for the reference intermediate matrix, which greatly limits the calculation complexity for producing the invention.

In one embodiment, said means for determining said rotation matrix also comprise storage means for storing said reference inverse matrix.

Thus, the inversion of this matrix is performed only once.

According to one embodiment, said means for determining said rotation matrix also comprise a multiplier for multiplying said intermediate matrix and said stored reference inverse matrix and delivering as output said rotation matrix.

The rotation matrix of the solid is obtained directly, in a simple manner.

In one embodiment, the system also comprises means for determining said parameters representing the orientation of the solid based on the coefficients of said rotation matrix.

The attitude angles of the solid or the quaternion representing the orientation of the solid are then deduced immediately from the rotation matrix of the solid.

According to one embodiment, said third vector is the vector product of the first vector field measured and, if necessary, corrected and of the second vector field measured and, if necessary, corrected.

The vector product is a third vector which satisfies the above-mentioned conditions and is simple to calculate.

In one embodiment, said first vector field is the Earth's gravitational field and said second field is the Earth's magnetic field.

The invention applies in a nonlimiting manner to the Earth's gravitational and magnetic fields.

According to one embodiment, said correction means are suitable for correcting the measured gravitational field to a corrected gravitational field by adding to the measured gravitational vector a vector proportional to the measured Earth's magnetic vector so that the corrected gravitational vector forms with the measured Earth's magnetic vector an angle equal to a reference angle equal to the substantially constant angle between the Earth's gravitational field and the Earth's magnetic field in said fixed coordinate system not linked to the solid, and suitable for centering the corrected gravitational vector.

In one embodiment, said parameters representing the orientation of the solid comprise attitude angles such as the Cardan angles or the Euler angles, or a quaternion.

According to another aspect of the invention, there is also proposed a method for determining parameters representing the orientation of a solid in movement, subject to a first vector field and a second vector field, of substantially constant directions in a fixed coordinate system not linked to the solid, in which the components of said respective vector fields are measured along the axes of respective triaxial sensors, and the rotation matrix of the solid is determined. The influence exerted on the measurements of at least one of said sensors is corrected by an additional vector field of the same nature as said measured vector field and at least one corrected vector field vector is delivered. A third vector is calculated which is not coplanar to the plane formed by the two vectors delivered as correction output, and such that the angles of the axis system formed by the third vector and the two vectors delivered as correction output remain substantially constant.

In one implementation, the measurements of the first and second vector fields are orthogonalized and centered, and said correction is deactivated at an instant taken for reference, during the calculation of a third reference vector.

BRIEF DESCRIPTION OF THE DRAWINGS

The invention will be better understood on studying a few embodiments described as nonlimiting examples and illustrated by the appended drawings in which.

DETAILED DESCRIPTION OF PREFERRED EMBODIMENT

In the following description, reference is made to the attitude angles of a solid. The solid does not, however, form part of the system for determining attitude angles, which correspond more specifically to those of the sensors likely to be fixed to the solid. Moreover, the terms "orientation" and "angular position" are used synonymously.

Hereinafter in the description, in a nonlimiting manner, the two vector fields are the Earth's gravitational field and the Earth's magnetic field. Obviously, the invention also applies to any two vector fields that are substantially constant in a fixed coordinate system not linked to the solid.

Figure 1:
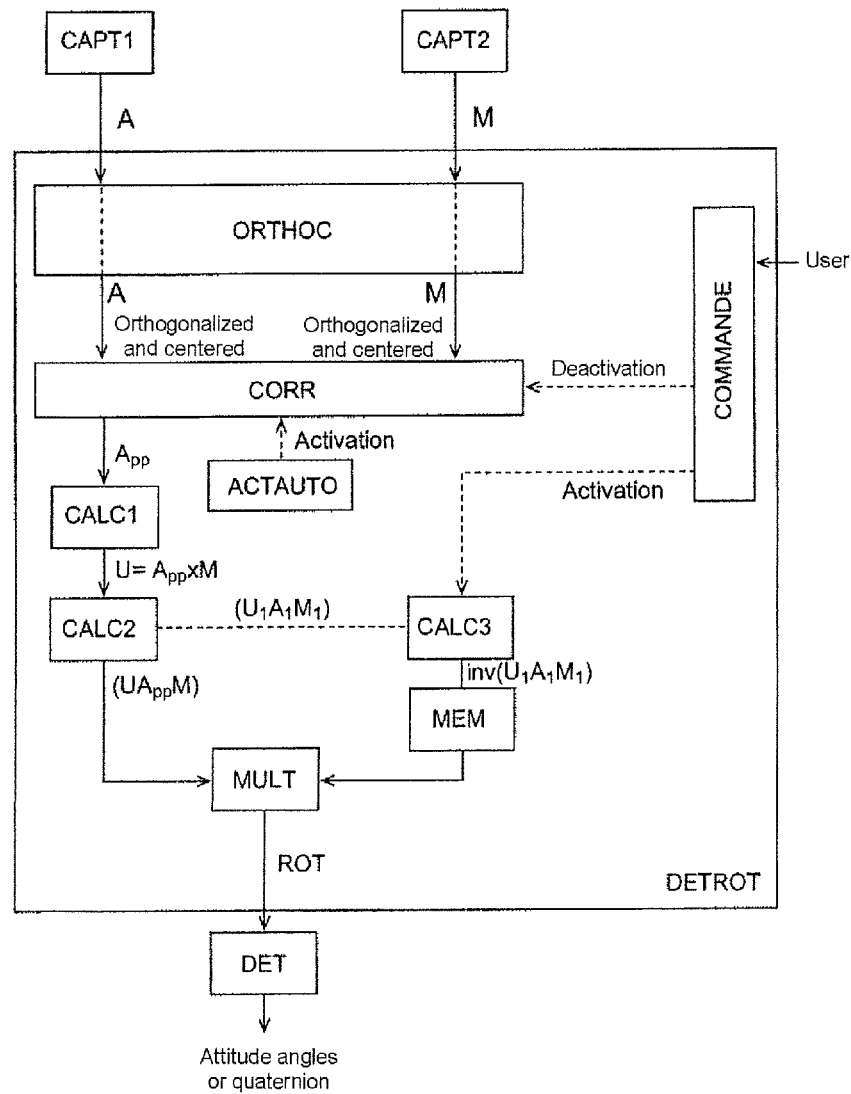
FIG. 1 diagrammatically illustrates one embodiment of a system according to one aspect of the invention.

As illustrated in FIG. 1, the system comprises a triaxial accelerometer CAPT1 which measures, in a reference frame linked to the solid, the gravitational field A and a triaxial magnetometer CAPT2 which measures, in the reference frame, the magnetic field M.

The measurements transmitted by the triaxial accelerometer CAPT1 and by the triaxial magnetometer CAPT2 are transmitted to a module DETROT for determining the rotation matrix ROT and are orthogonalized and centered by a module ORTHOC. In a variant, the orthogonalization and the centering of the measurements transmitted by the triaxial sensors CAPT1 and CAPT2 can be directly performed within the sensors themselves.

The expression "orthogonalization of the measurements delivered by a triaxial sensor" should be understood to mean an a posteriori correction of the perpendicularity defects of the sensor, and the expression "centering of the measurements delivered by a sensor" should be understood to mean a correction of the offset of the sensor so that it has a zero response to a zero stimulus.

A correction module CORR, which can be deactivated on command by a user of the system, via a control module COMMANDE, makes it possible to correct the influence exerted on the measurements of at least one of the sensors by an additional vector field of the same nature as that measured. In the case in point, an acceleration specific to the solid is measured by the triaxial accelerometer CAPT1 above the reference gravitational field A1. In such an exemplary embodiment, the correction module CORR adds to the measurement vector A a vector parallel to the measurement vector M: A+t.M, which is called $A_{PP}$, t being a scalar determined such that the angle formed by $A_{PP}$ and M is equal to the angle between the Earth's gravitational and magnetic fields of substantially constant directions in a fixed coordinate system not linked to the solid.

Optionally, an automatic activation module ACTAUTO tests whether a norm of one of said vector fields is above a reference threshold, and, if the norm of one of said vector fields is above this reference threshold, automatically activates the correction module CORR, or deactivates it otherwise.

A first calculation module CALC1 calculates a third vector U that is not coplanar to the plane formed by the two vectors delivered by the correction module CORR, and such that the angles of the axis system formed by the third vector U and the two vectors $A_{PP}$ and M delivered by the correction module remain constant. In this example with the Earth's gravitational and magnetic fields, the first calculation module CALC1 calculates the vector product U of the vectors $A_{PP}$ and M delivered by the correction module CORR ($U=A_{PP} \times M$, × being the symbol of the vector product).

Figure 3:
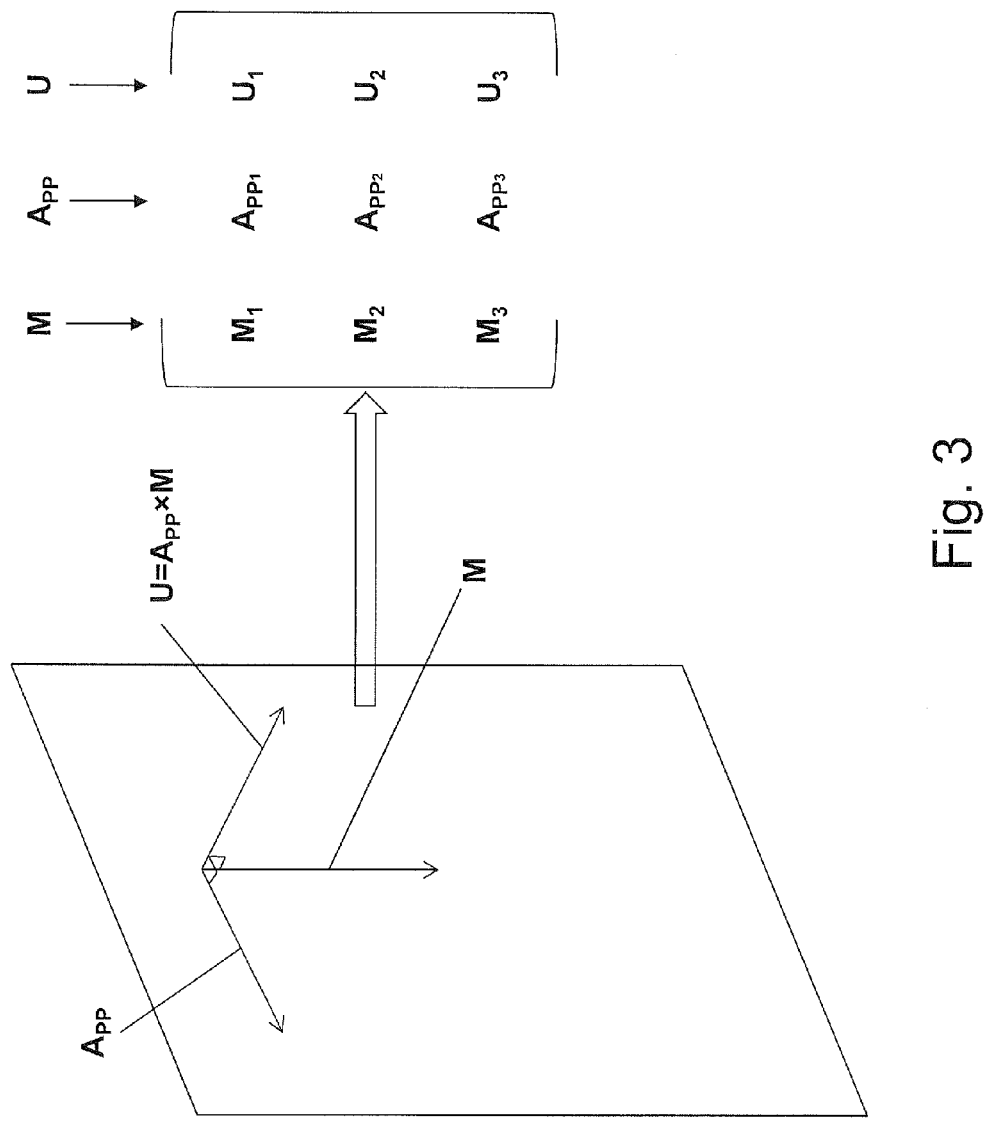
FIG. 3 illustrates a third vector, a first corrected measurement vector, and a second measurement vector forming successive columns of an intermediate matrix used to derive a rotation matrix according to an embodiment of the invention.

As illustrated in FIG. 3, a second calculation module CALC2 forms an intermediate matrix ($UA_{pp}M$) whose successive columns are formed by the components of the third vector U, of the corrected measurement vector $A_{pp}$, and of the measurement vector M.

During the deactivation of the correction module CORR by the control module COMMANDE, the second calculation module CALC2 creates an intermediate matrix ($U_1A_1M_1$) corresponding to the reference third vector $U_1$. A third calculation module CALC3 is activated by the control module COMMANDE enabling a user to define the reference of the system. The third calculation module CALC3 calculates the inverse of a matrix; in this case, calculates the inverse of the matrix ($U_1A_1M_1$) of the reference vectors ($U=A_1 \times M_1$) which is called reference inverse matrix $inv((U_1A_1M_1))$, and which is stored in a storage module MEM. This reference inverse matrix $inv((U_1A_1M_1))$ is calculated once.

When the system is in steady-state operation, the correction module CORR is activated, and the third calculation module CALC3 is deactivated.

A multiplication module MULT receives as input the intermediate matrix ($UA_{PP}M$) and the stored reference inverse matrix $inv((U_1A_1M_1))$, respectively from the second calculation module CALC2 and from the storage module MEM, and delivers as output the matrix product of these two matrices, equal to the rotation matrix ROT representing the rotation of the solid.

From the rotation matrix ROT, a determination module DET determines the parameters representing the orientation of the solid. The parameters representing the orientation of the solid may be, for example, the attitude angles of the solid, such as the yaw, roll and pitch angles. In a variant, the parameters representing the orientation of the solid may be, for example, a quaternion.

In the case of the attitude angles, this determination by identification of the attitude angles can be performed by multiplying the rotation matrix ROT by the vector $V1=[1\ 0\ 0]$, which gives a second vector $V2=[x\ y\ z]$, such that the yaw angle YAW, which is the projection of V2 onto the plane (x, y), satisfies the following equation: $\tan(YAW)=y/x$. For the roll ROLL and pitch PITCH angles, similar identifications can be used.

In the case of the quaternion, this determination makes it possible to retrieve the quaternion (vector of the rotation axis and rotation) associated with the rotation, by a simple calculation using the plot of the rotation matrix.

Figure 2:
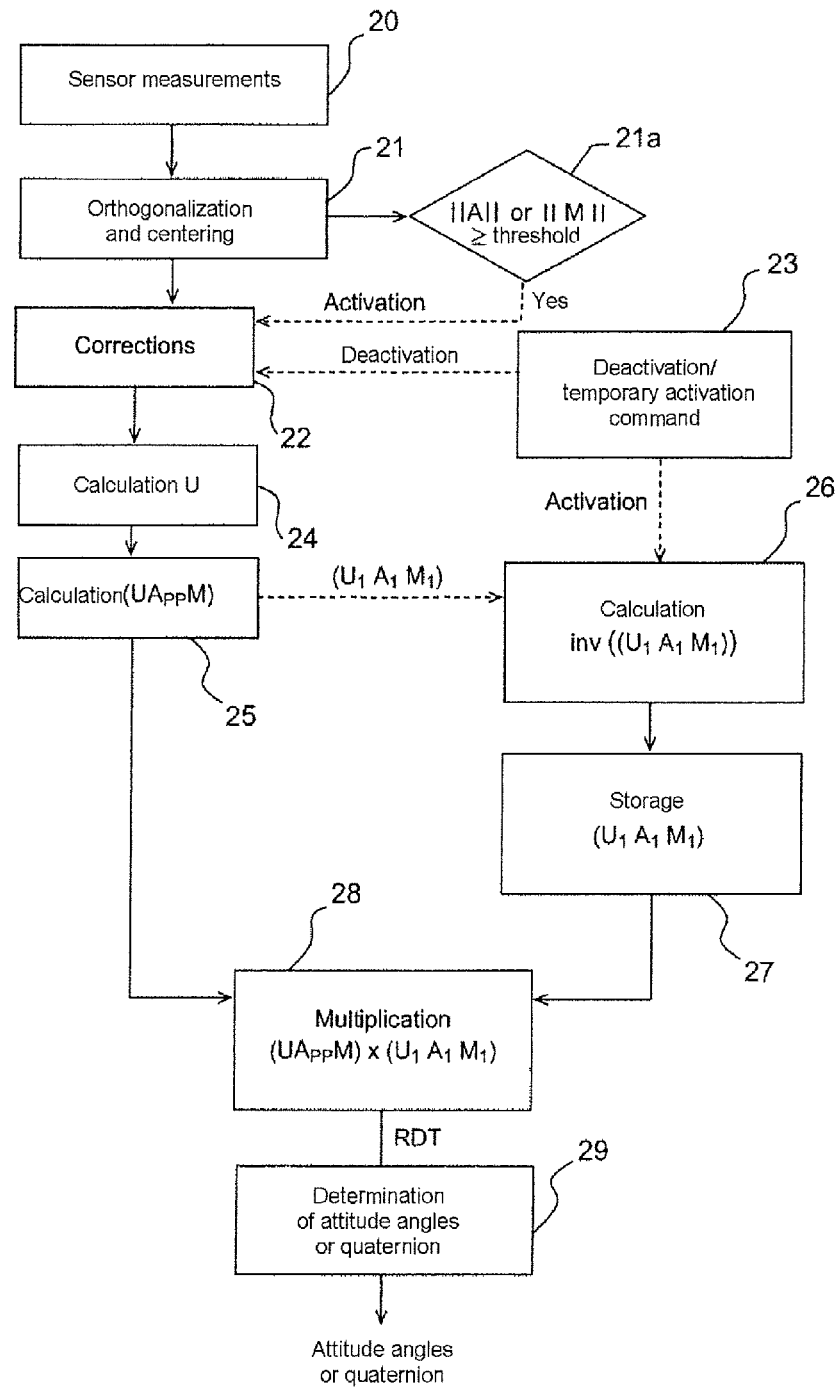
FIG. 2 diagrammatically illustrates one implementation of the method according to one aspect of the invention.

FIG. 2 illustrates the operation of a system according to FIG. 1. The triaxial sensors CAPT1 and CAPT2 perform measurements (step 20), which are orthogonalized and centered (step 21) by the module ORTHOC.

The influence exerted on the measurements of at least one of the sensors by an additional field of the same nature as that measured, in this case an acceleration specific to the solid, is measured by the triaxial accelerometer CAPT1 above the reference gravitational field A1, and is corrected (step 22) by the correction module CORR in the manner described previously. This step may be deactivated, or in other words not performed, on temporary command (step 23) by a user of the system, notably when said user wants to define a reference of the system.

An optional automatic test (step 21a) is performed to check whether the norm of one of the orthogonalized and centered vectors A or M, delivered by the orthogonalization and centering module ORTHOC, is above a reference threshold, and, if this condition is satisfied, the automatic activation module ACTAUTO activates the correction module CORR.

A third vector U is then calculated (step 24) such that it is not coplanar to the plane formed by the two vectors delivered by the correction module CORR, and such that the angles of the axis system formed by the third vector U and the two vectors $A_{PP}$ and M delivered by the correction module remain constant. For example, U may be the vector product of the vectors $A_{PP}$ and M delivered by the correction module CORR, calculated by the first calculation module CALC1.

The second calculation module CALC2 then calculates (step 25) an intermediate matrix ($UA_{PP}M$) whose successive columns are formed by the components of the third vector U, of the corrected measurement vector $A_{PP}$, and of the measurement vector M.

During the command (step 23) to deactivate the correction (step 22) made by the correction module CORR, the control module COMMANDE also activates the third calculation module CALC3 (step 26) to calculate the reference inverse matrix $inv((U_1A_1M_1))$ defined previously. This reference inverse matrix $inv((U_1A_1M_1))$ is stored (step 27) in the storage module MEM.

In steady-state operation, without any reference-taking command (step 23) for the system, the multiplication module MULT performs the matrix product or multiplication (step 28) of the intermediate matrix ($UA_{PP}M$) and of the stored reference inverse matrix $inv((U_1A_1M_1))$ to supply as output the rotation matrix ROT of the rotation of the solid.

The determination module DET then determines (step 29) the attitude angles of the solid or the quaternion from the rotation matrix ROT, for example as described previously for the module DET.

The present invention therefore makes it possible, with a reduced number of calculations supplying the attitude angles of a solid in movement or a quaternion from the rotation matrix, to produce a small portable system that can be used to capture the movement of a solid.

What is claim is:

1. A system for continuously determining parameters representing an orientation of an object in movement, said object subject to a first vector field from a gravitational field of the Earth and a second vector field from a magnetic field of the Earth, said fields having predetermined directions in a fixed coordinate system not linked to the object, said system comprising:
a motion-capture device comprising a triaxial accelerometer and a triaxial magnetometer, configured to be coupled to said object, for measuring components of said respective first and second vector fields along axes of said sensors to obtain a gravitational measurement vector and a magnetic measurement vector, and
a processor for determining said parameters representing the orientation of the object,
wherein said processor for determining said parameters comprises at least:
a correction module, which can be deactivated on command, configured to utilize the gravitational measurement vector and the magnetic measurement vector to provide a first corrected vector corresponding to the gravitational measurement vector and a second corrected vector corresponding to the magnetic measurement vector, wherein the first corrected vector is the gravitational measurement vector with any associated corrections and the second corrected vector is the magnetic measurement vector with any associated corrections; and a calculation module configured to calculate a third vector which is not coplanar to a plane formed by the first corrected vector and the second corrected vector, and to utilize the first corrected vector, the second corrected vector, and the third vector to obtain the parameters representing the orientation of the object;

wherein the parameters representing the orientation of the object are used for positioning or operation of the object or another object.

2. The system as claimed in claim 1, wherein said processor for determining said parameters further comprises a module for orthogonalizing and centering the gravitational measurement vector and the magnetic measurement vector.

3. The system as claimed in claim 1, wherein said calculation module further utilizes reference information related to the fixed coordinate system to obtain the parameters representing the orientation of the object, and the processor for determining said parameters further comprises a control module configured to deactivate said correction module at an instant taken for reference, while said first calculation module calculates a third vector of reference to generate the reference information.

4. The system as claimed in claim 3, further comprising an automatic activation module configured to activate said correction module when a norm of at least one of said gravitational measurement vector and magnetic measurement vector provided by said triaxial sensors is above a reference threshold, and for deactivating said correction module when said norm is below or equal to said reference threshold.

5. The system as claimed in claim 4, wherein said processor for determining said parameters further comprises a second calculation module for calculating an intermediate matrix whose successive columns are components of said third vector, the first corrected vector, and the second corrected vector.

6. The system as claimed in claim 5, wherein said processor for determining said parameters further comprises a third matrix inversion calculation module, configured to be activated by said control module when calculating the third reference vector and for calculating an inverse matrix of said intermediate matrix corresponding to the third reference vector to generate the reference information.

7. The system as claimed in claim 6, wherein said processor for determining said parameters further comprises storage for storing said inverse matrix.

8. The system as claimed in claim 7, wherein said processor for determining said parameters further comprises a multiplier for multiplying said intermediate matrix and said stored inverse matrix and delivering as output a rotation matrix corresponding to said parameters.

9. The system as claimed in claim 1, further comprising a module for determining said parameters representing the orientation of the Solid object based on coefficients of a rotation matrix corresponding to said parameters.

10. The system as claimed in claim 1, wherein said third vector is obtained from the vector product of the first corrected vector and the second corrected vector.

11. The system as claimed in claim 10, wherein said correction module is configured to correct the gravitational measurement vector to the first corrected vector by adding to the gravitational measurement vector a vector proportional to the magnetic measurement vector so that the first corrected vector forms with the magnetic measurement vector an angle equal to the angle between the first vector field and the second vector field.

12. The system as claimed in claim 1, wherein said parameters representing the orientation of the object comprise attitude.

13. A method for continuously determining parameters representing an orientation of an object in movement, said object subject to a first vector field from a gravitational field of the Earth and a second vector field from a magnetic field of the Earth, said fields of substantially constant directions in a fixed coordinate system not linked to the object, the method comprising:

measuring components of said respective fields by a motion-capture device along axes of respective triaxial sensors of the motion-capture device to obtain a gravitational measurement vector indicating the first vector field as measured and a magnetic measurement vector indicating the second vector field as measured; and determining, using a processor, the parameters representing the orientation of the object by:

utilizing the gravitational measurement vector and the magnetic measurement vector to provide a first corrected vector corresponding to the gravitational measurement vector and a second corrected vector corresponding to the magnetic measurement vector, wherein the first corrected vector is the gravitational measurement vector with any associated corrections and the second corrected vector is the magnetic measurement vector with any associated corrections;

calculating a third vector which is not coplanar to a plane formed by the first corrected vector and the second corrected vector; and utilizing the first corrected vector, the second corrected vector, the third vector and reference information related to the fixed coordinate system to obtain the parameters representing the orientation of the object;

wherein the third vector, the first corrected vector, and the second corrected vector form successive columns of an intermediate matrix, from which the parameters representing the orientation of the object are derived by the processor;

wherein the parameters representing the orientation of the object are used for positioning or operation of the object or another object.

14. The method as claimed in claim 13, further comprising:

orthogonalizing and centering the gravitational measurement vector and the magnetic measurement vector, and deactivating said correction at an instant taken for reference during the calculation of a third vector of reference to generate the reference information.

15. The system as claimed in claim 1, wherein the first corrected vector is derived based on a vector sum of the gravitational measurement vector and the magnetic measurement vector scaled by a constant, and the second corrected vector is the magnetic measurement vector.

16. The system as claimed in claim 12, wherein attitude angles include at least one from the group consisting of Cardan angles or Euler angles, or a quaternion.

17. The method as claimed in claim 13, wherein the first corrected vector is derived based on a vector sum of the gravitational measurement vector and the magnetic measurement vector scaled by a constant, and the second corrected vector is the magnetic measurement vector.

18. The system as claimed in claim 4, wherein said processor for determining said parameters further comprises a second calculation module for calculating an intermediate matrix whose successive columns are components of said third vector, the first vector, and the second vector.

\* \* \* \* \*